(12) United States Patent
Calvert

(10) Patent No.: US 8,857,684 B1
(45) Date of Patent: Oct. 14, 2014

(54) SLIDE-OUT TRUCK TOOL BOX

(71) Applicant: Slide Out Associates, Trustee for Slide Out CRT Trust, Manassas, VA (US)

(72) Inventor: S. Mill Calvert, Manassas, VA (US)

(73) Assignee: Slide Out Associates, Trustee for Slide Out CRT Trust, Manassas, VA (US)

( * ) Notice: Subject to any disclaimer, the term of this patent is extended or adjusted under 35 U.S.C. 154(b) by 0 days.

(21) Appl. No.: 13/973,468

(22) Filed: Aug. 22, 2013

(51) Int. Cl.
*B60R 9/00* (2006.01)
*B60R 11/06* (2006.01)

(52) U.S. Cl.
CPC ..................... *B60R 11/06* (2013.01)
USPC ............................ 224/404; 224/281; 224/510

(58) Field of Classification Search
CPC ............ B60R 9/00; B60R 11/06; B60R 7/04; B60P 3/14
USPC ......... 224/404, 281, 402, 403, 496, 498, 510, 224/539, 542; 296/26.09, 37.6; 312/295, 312/298, 301, 299, 308, 310, 311, 330.1, 312/333, 334.44, 349.3
See application file for complete search history.

(56) References Cited

U.S. PATENT DOCUMENTS

| | | | | | |
|---|---|---|---|---|---|
| 2,490,014 | A | * | 12/1949 | de Villiers Brand | ........ 296/26.09 |
| 2,952,497 | A | * | 9/1960 | Bowden | ........................ 312/221 |
| 4,197,600 | A | * | 4/1980 | Slabic | ................................ 5/118 |
| 4,288,011 | A | | 9/1981 | Grossman | |
| 4,733,898 | A | * | 3/1988 | Williams | .................... 296/24.32 |
| 4,830,242 | A | * | 5/1989 | Painter | ...................... 224/42.32 |
| 4,844,305 | A | | 7/1989 | McKneely | |
| 5,088,636 | A | * | 2/1992 | Barajas | ......................... 224/281 |
| 5,634,577 | A | * | 6/1997 | Pearson et al. | ................. 224/242 |
| 5,979,725 | A | * | 11/1999 | Lehrman | ....................... 224/539 |
| 6,276,735 | B1 | * | 8/2001 | Champion | ................... 296/37.6 |
| 8,215,688 | B2 | * | 7/2012 | Hipshier et al. | ........... 296/24.34 |
| 2002/0014505 | A1 | * | 2/2002 | Lance et al. | .................. 224/404 |
| 2006/0097021 | A1 | * | 5/2006 | Stanton | ......................... 224/510 |

\* cited by examiner

*Primary Examiner* — Brian D Nash
*Assistant Examiner* — Corey Skurdal
(74) *Attorney, Agent, or Firm* — Louis Ventre, Jr.

(57) ABSTRACT

A tool box assembly for a truck is formed of nested boxes that telescope out to add additional storage space. There is an outer box and one or more inner boxes slidably engaged so that the inner boxes telescope out of the outer box, which is normally fixed to the truck's cargo bed across the width of the truck so that when they slide out, the inner boxes move out horizontally toward the rear end of the truck. The rear wall of each inner box locks in extended telescoped position to fill in the hole in the wall created by its having been telescoped out. Each inner box preferably has a top cover that slides around the bottom and sides of the inner box to close the top opening of the inner box.

4 Claims, 3 Drawing Sheets

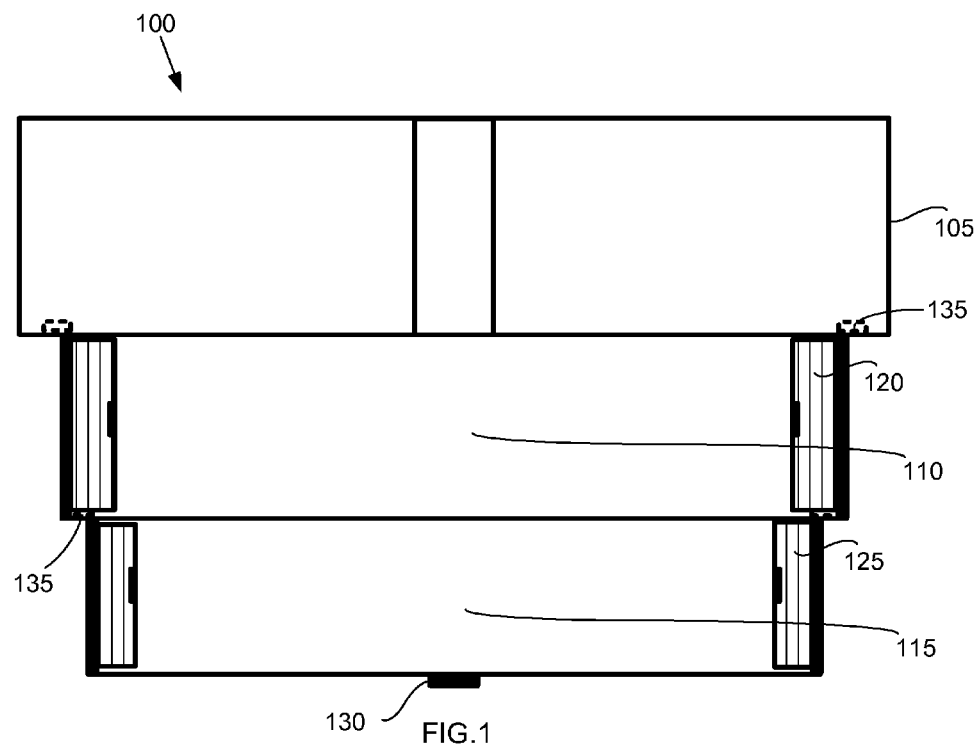
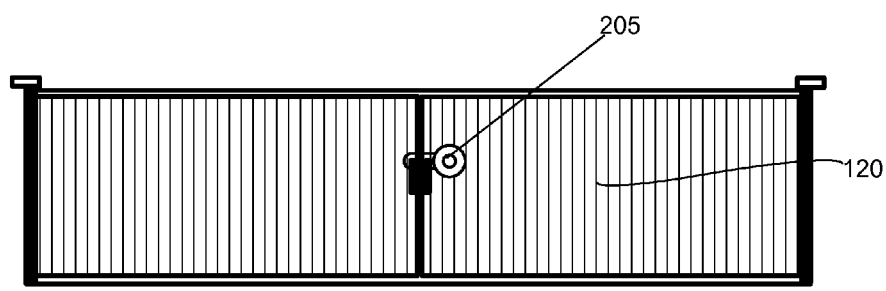

US 8,857,684 B1

SLIDE-OUT TRUCK TOOL BOX

TECHNICAL FIELD

In the field of package and article carriers secured to the bed of a truck, a tool container assembly is composed of nested boxes that telescope out to add additional storage space such that each telescoping box may be independently covered and locked.

BACKGROUND ART

Trucks, particularly pickup trucks, having open cargo beds are used extensively by professional tradesmen to organize and transport tools to job sites. The most popular tool boxes are lockable tool boxes spanning the bed at the cab end of the cargo bed and usually occupying less than two feet of cargo bed length. These are called cross-bed boxes or cross-over boxes and are used to shield the tools from inclement weather as well as protect the tools from theft at the job site. Such tool boxes are most commonly available with a single lid opening up towards the cab or with gull wing doors, that is, with double doors, each door independently opening from a side of the vehicle towards the middle.

SUMMARY OF INVENTION

A tool box assembly for a truck is formed of nested boxes that telescope out to add additional storage space. There is an outer box and one or more inner boxes slidably engaged so that the inner boxes telescope out of the outer box, which is normally fixed to the truck's cargo bed across the width of the truck so that when they slide out, the inner boxes move out horizontally toward the rear end of the truck. The rear wall of each inner box locks in extended telescoped position to fill in the hole in the wall created by its having been telescoped out. Each inner box preferably has a top cover that slides around the bottom and sides of the inner box to close the top opening of the inner box.

Technical Problem

High quality tool box designs seek to add tool storage space losing a minimum amount of valuable cargo space, often needed to haul on-the-job materials. Existing tool box designs often attempt to organize space within the box by providing drawers or carousel devices that only diminish storage space. What is missing is a tool box assembly that can be adjusted to increase storage space only on an as needed basis. The increased storage space must also provide weather protection and theft security for the tools placed in the additional storage space.

Solution to Problem

The solution is a slide-out tool box for a truck that provides extra lockable tool storage when needed. The slide-out tool box looks like a traditional truck tool box, but when more space is needed for locking up tools, one or two additional tool boxes on roller tracks can be pulled out into the bed of the truck. These extra telescoping tool boxes have sliding top doors that are lockable. When a contractor is not using the extra boxes and they are nested together in the main tool box, their tops are slid open and the main box provides storage as usual. A handle on one or both extra boxes makes it easy to pull them out like a filing cabinet drawer, except that they are nested together, one inside the other. When they are telescoped out, the rear wall locks in a deployed position and closes off the opening created by telescoping them out.

Advantageous Effects of Invention

A tradesman with a pickup truck and a tool box can now install a tool box that occupies a minimum of cargo bed space, yet is expandable to add secure tool storage space by simply sliding out the nested boxes. This will both maximize preservation of cargo space when not in use and prevent theft of valuable tools when needed for a particular job.

BRIEF DESCRIPTION OF DRAWINGS

The drawings illustrate preferred embodiments of the slide-out truck tool box according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 1 is a top view of a preferred tool container assembly with two internal boxes telescoped out.

FIG. 2 is a top view of an internal box with the slidable top cover in a closed position.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 7:
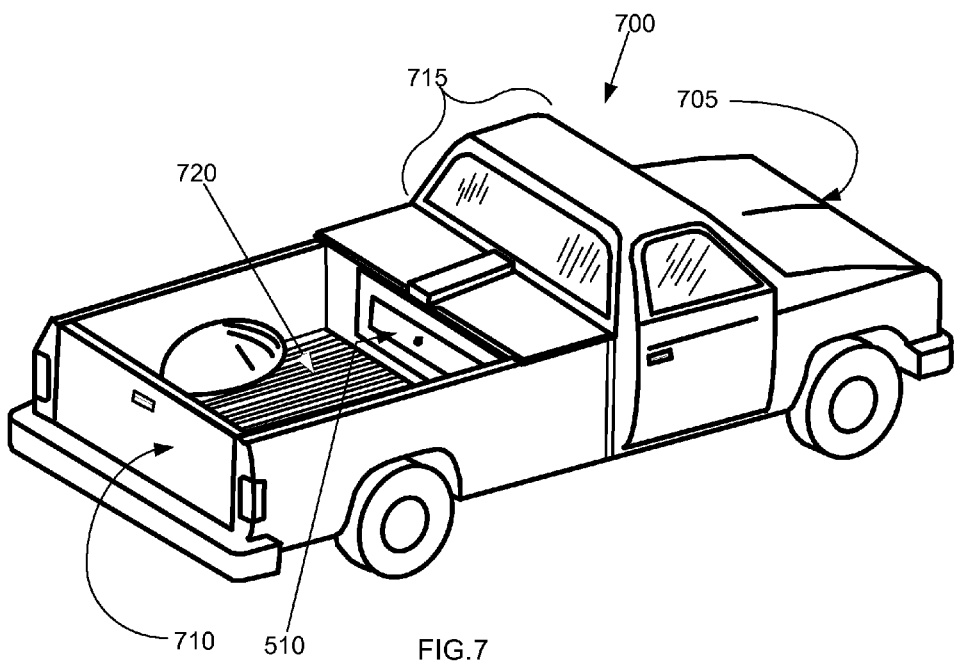
FIG. 7 is a perspective of a truck with the tool container shown with the boxes in a nested position.

The truck (700) in FIG. 7 serves as an example of how a preferred embodiment of the tool container assembly (100) would be preferably installed. The truck (700) has a front end (705) and a rear end (710), a cab (715) near the front end (705) and a cargo bed (720) between the cab (715) and the rear end (710). The cargo bed (720) has a substantially horizontal floor. The truck might also be a flat bed truck or any other truck, but preferably having a cargo bed (720) that is relatively flat so as to permit the telescoping operation of the inner boxes to take place without interference from any surrounding structural components of the truck.

FIG. 1 shows a top view this preferred embodiment of the tool container assembly (100) where an outer box (105) and two internal boxes, a first inner box (110) and a second inner box (115), are telescoped out in a fully extended position.

Thus, the tool container assembly (100) includes a plurality of boxes nested together. These boxes preferably have four vertical sides, a bottom and an openable cover or lid. Each box in the plurality of boxes comprises a first wall (510) facing the rear end (710) and a second wall (505) facing the front end (705). The first wall (510) from the perspective of a person looking at it as installed in FIG. 7, might also be considered the container assembly's front wall.

Figure 4:
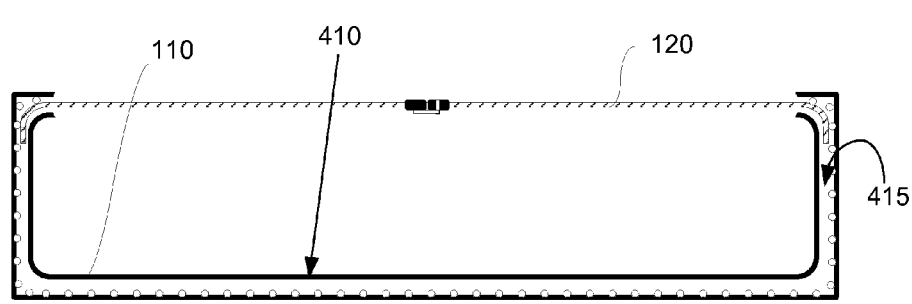
FIG. 4 is a front elevation sectional view of an inner box having a channel for the slidable top cover, the slidable top cover shown in a position closing the inner box.
Figure 5:
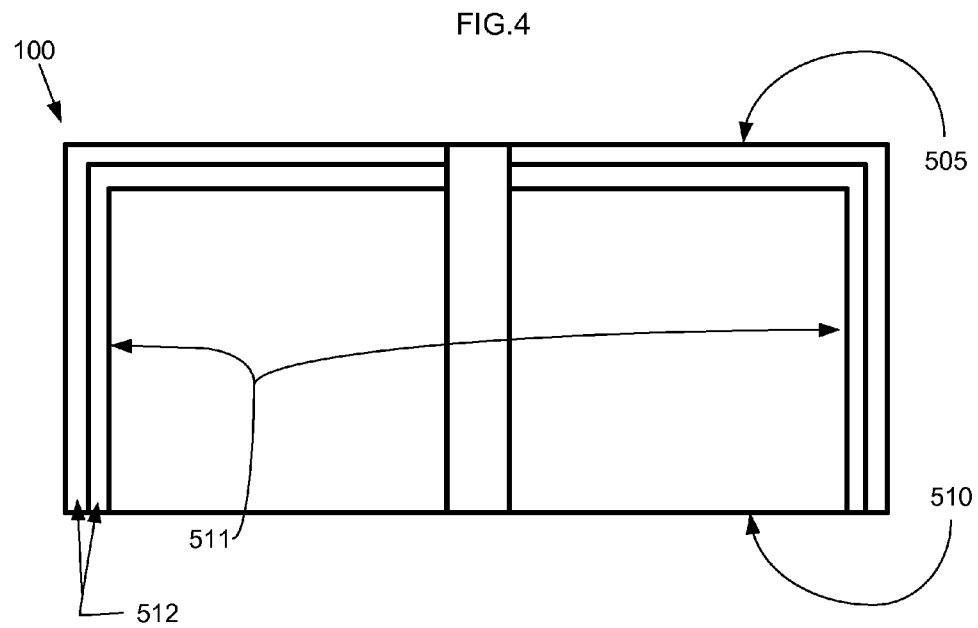
FIG. 5 is a top view of the tool container assembly with two internal boxes in the nested position.

The outer box (105) is preferably secured in position with respect to the cargo bed (720) so that it is immobilized with respect to the truck (700). The first inner box (110) is slidably affixed within the outer box (105) to telescope out of the outer box (105) in a direction towards the rear end (710) of the truck (700) and substantially parallel to the horizontal floor of the truck (700). The sliding mechanism is preferably similar to a filing cabinet slide that telescope out as the box is telescoped out. The slide may be mounted at the bottom center of the inner boxes to avoid interference with the slidable top covers, or when a channel (415) is provided for the slidable top cover, as shown in FIG. 4, it may be mounted to opposing outside walls of the channel (415).

The second inner box (115) is similarly slidably affixed, but it is slidably affixed within the first inner box (110). The second inner box (115) telescopes out of the first inner box (110) in a direction towards the rear end (710) of the truck (700) and substantially parallel to the horizontal floor of the cargo bed (720).

Figure 6:
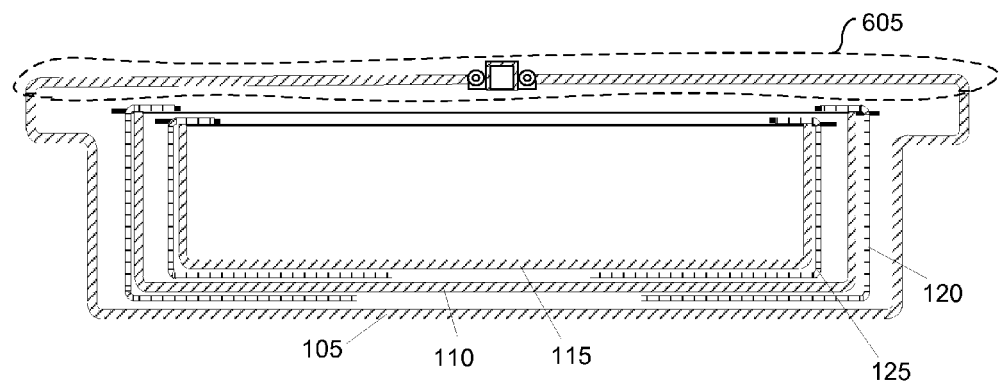
FIG. 6 is a front elevation sectional view of the tool container assembly in the nested position showing the internal covers in a stored position along the sides and bottom to the internal boxes.

When any inner box is telescoped out of another box, it leaves a hole in the front side wall, that is, the first wall (510) facing the rear end of the truck (700). This hole is filled by the rear wall of the inner box once the inner box is fully extended or telescoped out. Thus, when the first inner box (110) is telescoped out of the outer box (105), the second wall (505) of the first inner box (110) completes the first wall (510) of the outer box (105) so that the outer box (105) can be closed with a lid. This lid is exemplified by the top lid (605), shown within the dashed enclosure in FIG. 6. Preferably, each inner box is automatically latched in place when fully retracted and fully extended. The latch (135) mechanism may be released by a lever within or adjacent to the handle (130), much in the same way as is done in a lockable filing cabinet drawer release.

Figure 3:
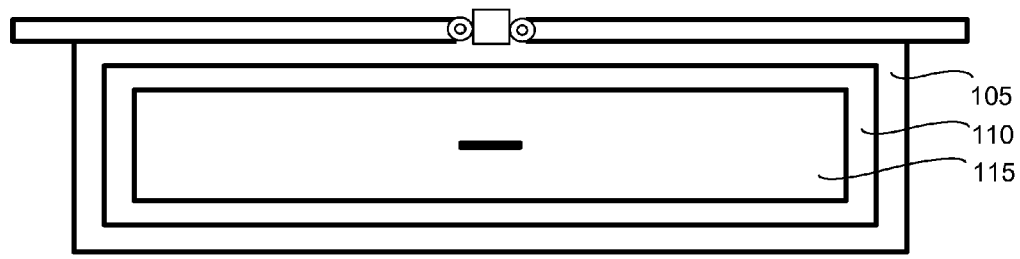
FIG. 3 is a front elevation view of the tool container assembly with two internal boxes in a nested position within the outer box.

The tool container assembly (100) includes a first top cover (120) for the first inner box (110) that is slidably contained within a space (512) defined between the outer box (105) and the first inner box (110) when all of the boxes in the plurality of boxes are nested together. Preferably, for each inner box there is sufficient space between adjacent boxes so that the space for holding the slidable cover extends around the sides of the inner box and into the bottom space between the boxes as shown in FIG. 3.

Thus, the tool container assembly (100) includes a second top cover (125) for the second inner box (115). The second top cover (125) is slidably contained within a space (512) defined between the first inner box (110) and the second inner box (115) when all of the boxes in the plurality of boxes are nested together.

Accordingly, each box in the plurality of boxes has a cover or lid that is openable from the top of the respective box. When the boxes are nested together and when the covers of the first inner box (110) and second inner box (115) are slid to an open position, then at that time, opening the top lid (605) to the outer box (105) provides access to the first inner box (110) and the second inner box (115) therewithin.

The first top cover (120) and the second top cover (125) have a lock (205) so that they may be independently secured. Preferably, each top cover for the inner boxes has a lock (205), as does the top lid (605) to the outer box (105). The lock (205) may be a cylinder lock or any other type lock.

In an alternative embodiment, the tool container assembly for a truck (700) has two or more nested boxes. As with the other embodiments, the typical truck has a front end (705) and a rear end (710), a cab (715) near the front end (705) and a cargo bed (720) between the cab (715) and the rear end (710). The cargo bed (720) preferably has a substantially horizontal floor. In this embodiment, the tool container assembly (100) includes a plurality of boxes nested together. Each box in the plurality of boxes comprises: a box bottom (410); and side walls (511). The plurality of boxes includes at least an outer box (105) and a first inner box (110). The outer box (105) is mounted in a fixed position relative to the cargo bed (720) and the first inner box (110) is slidably affixed within the outer box (105) to telescope out of the outer box (105) in a direction towards the rear end (710) and substantially parallel to the horizontal floor. A top lid (605) to the outer box (105) is structured to open to provide access to storage within the tool container assembly (100). The first inner box (110) when telescoped out of the outer box (105) completes a wall to the outer box (105) so that the top lid (605) can close off the outer box (105). A top cover for the first inner box (110) is slidably contained around the first inner box (110). The top cover is the same as the first top cover (120), described above, which is configured to close the first inner box (110) by sliding around the first inner box (110).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the container industry.

What is claimed is:

1. A tool container assembly for a truck, the truck having a front end and a rear end, a cab near the front end and a cargo bed between the cab and the rear end, the cargo bed comprising a substantially horizontal floor, the tool container assembly comprising:
   a plurality of boxes nested together, wherein each box in the plurality of boxes comprises a first wall facing the rear end and a second wall facing the front end;
   the plurality of boxes comprising:
      an outer box secured in position with respect to the cargo bed;
      a first inner box slidably affixed within the outer box to telescope out of the outer box in a direction towards the rear end and substantially parallel to the horizontal floor; and
      a second inner box slidably affixed within the first inner box to telescope out of the first inner box in a direction towards the rear end and substantially parallel to the horizontal floor; and
   when the first inner box is telescoped out of the outer box, the outer box then defines a hole where the first wall of the first inner box had been, and when the first inner box is fully extended and latched in place, then the second wall of the first inner box is flush with the exterior of, and completes, the first wall of the outer box.

2. The tool container assembly of claim 1, further comprising a first top cover for the first inner box slidably contained around the first inner box positioned and within a space defined between the outer box and the first inner box when all of the boxes in the plurality of boxes are nested together.

3. The tool container assembly of claim 1, further comprising a second top cover for the second inner box slidably contained within a space defined between the first inner box and the second inner box when all of the boxes in the plurality of boxes are nested together.

4. A tool container assembly for a truck, the truck having a front end and a rear end, a cab near the front end and a cargo bed between the cab and the rear end, the cargo bed comprising a substantially horizontal floor, the tool container assembly comprising:
- a plurality of boxes nested together, wherein:
  - each box in the plurality of boxes comprises: a box bottom; and side walls;
  - the plurality of boxes comprising an outer box and a first inner box;
  - the outer box is mounted in a fixed position relative to the cargo bed; and
  - the first inner box is slidably affixed within the outer box to telescope out of the outer box in a direction towards the rear end and substantially parallel to the horizontal floor;
- a top lid to the outer box, the top lid configured to open to provide access to storage within the tool container assembly;
- a latch that holds the first inner box in a fully extended position;
- wherein the first inner box, when in a fully extended position, latches in place and one of the side walls of the first inner box is flush with the one of the side walls of the outer box so that the top lid can close off the outer box;
- a top cover for the first inner box slidably contained around the first inner box; and
- wherein the top cover is configured to close the first inner box by sliding around the first inner box.

* * * * *